Feb. 27, 1962 S. A. PLATT 3,022,707
DEVICE FOR PROJECTING STILL PICTURE FILM
WITH SYNCHRONIZED SOUND
Filed Jan. 20, 1956 3 Sheets-Sheet 1

Inventor:
Stephen A. Platt
by Kenyon and Kenyon
Att'ys

United States Patent Office 3,022,707
Patented Feb. 27, 1962

3,022,707
DEVICE FOR PROJECTING STILL PICTURE FILM WITH SYNCHRONIZED SOUND
Stephen A. Platt, 1100 Fulton St., Grand Haven, Mich.
Filed Jan. 20, 1956, Ser. No. 560,384
1 Claim. (Cl. 88—28)

This invention relates to a device for projecting still picture film with synchronized sound. It permits the projection of a series of still pictures, or slides, with the pictures sequentially illustrating a story and accompanied by sound properly synchronized with the pictures so as to tell the story being illustrated or to provide an appropriate musical accompaniment or both.

The present application embraces subject matter disclosed in my co-pending patent application Serial No. 434,213, filed June 3, 1954, for "Process and Apparatus for Creating the Effect of Motion Picture Projection With Synchronized Sound." The present application is a continuation-in-part of the above application, which is now abandoned.

The above application discloses and claims a new process for creating the effect of motion picture projection with synchronized sound. This is effected by projecting each of a series of pictures for a time interval which is substantially longer than the time of the average person's persistence of vision and substantially shorter than the time required for such a person to appreciate an apparent halt in the action portrayed by the pictures. Sound effects characteristically associated by the average person with the various stages of the action portrayed by the projected pictures, is reproduced in synchronism with the projection of the pictures. The sound effects blend the picture action events together so as to create the impression of an uninterrupted flow of picture action. The desired simulation of so-called talking moving pictures is enhanced by having the still picture film shift horizontally and preferably each picture occupies two or three of the standard frame sizes so that the projected picture is very wide as compared to its height.

Furthermore, my mentioned patent application further discloses and claims a novel still picture frame projector and phonograph disk record play-back assembly which are synchronized with each other. The complete device is in the form of a relatively small, compact and sturdy unit which may be manufactured at low cost. The purpose was to provide a unit which can be mass-produced and distributed throughout the world for operation by unskilled persons in connection with the distribution of easily assimilated educational and religious knowledge everywhere.

The above device has fulfilled its purpose satisfactorily with the exception that it suffers from all of the troubles inherent to the operation of a phonograph using disk records. That is to say, it cannot be operated except when standing stationary and relatively free from vibration, the records are necessarily bulky to transport and are easily scratched or otherwise damaged.

With the foregoing in mind one of the objects of the present invention is to provide a device or machine capable of carrying out the described type of process, which may be manufactured economically in large quantities, which may absorb satisfactorily the rough treatment inherent to its transportation and operation in remote places, and which uses magnetic tape to provide the necessary audio.

At the present time tape recorders are very popular, are made in large quantities by competitive manufacturers, and have, therefore, become inexpensive and reliable devices adapted for operation by relatively unskilled persons. The sound quality is good and it is becoming possible to obtain these recorders made for use with one-quarter inch magnetic tape of unusual thinness and which, therefore, has great compactness. The picture film projector, disclosed by my mentioned application, is very compact and permits the satisfactory use of 16 mm. photographic film. It becomes obvious that there are great advantages to be obtained if this projector could be combined with a standard tape recorder of the commercially available type and with proper synchronism between the two instruments.

Consequently, another and important object of the present invention is to provide for using a standard tape recorder in combination with a still film picture projector so as to obtain the desired projection of the pictures with synchronized sound reliability, without great expense, and in a practically foolproof manner.

A specific example of the invention is illustrated by the accompanying drawings in which:

FIG. 3 is a vertical cross section, the line 2—2 in this figure generally indicating the levels on which FIG. 2 is taken.

Figure 1:
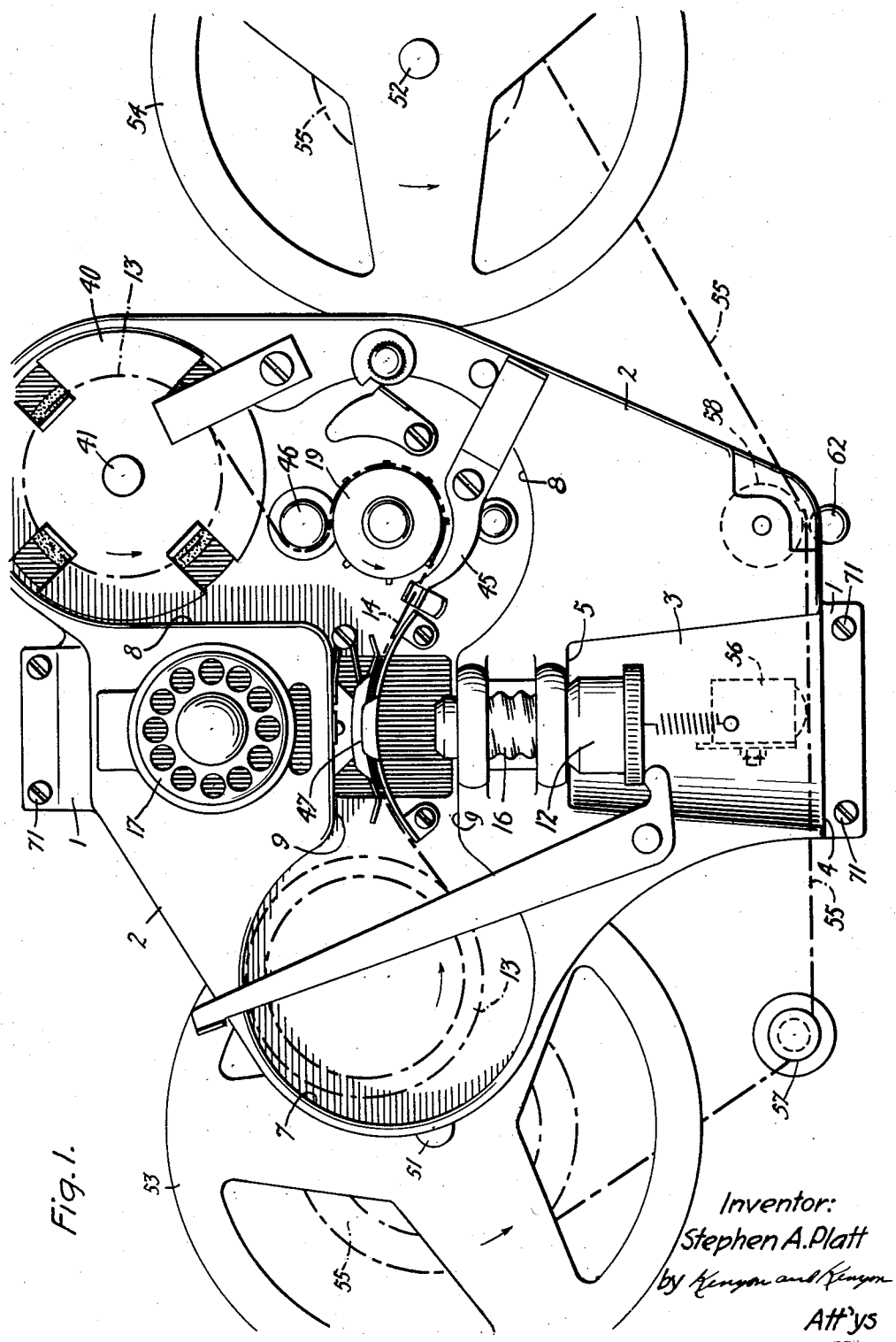
FIG. 1 is a top or plan view.
Figure 2:
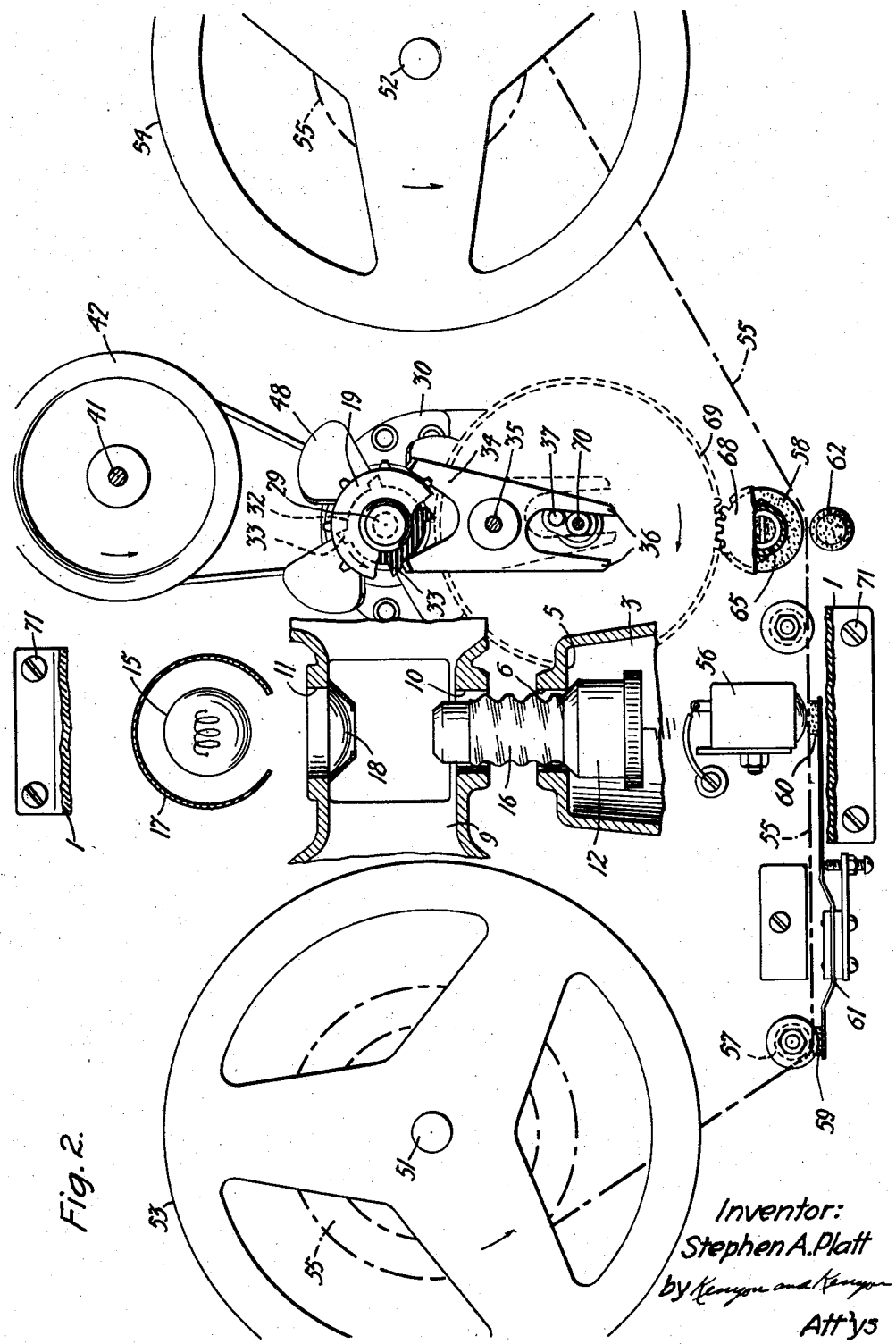
FIG. 2 is a top view showing a lower level of parts below those shown by FIG. 1.
Figure 3:
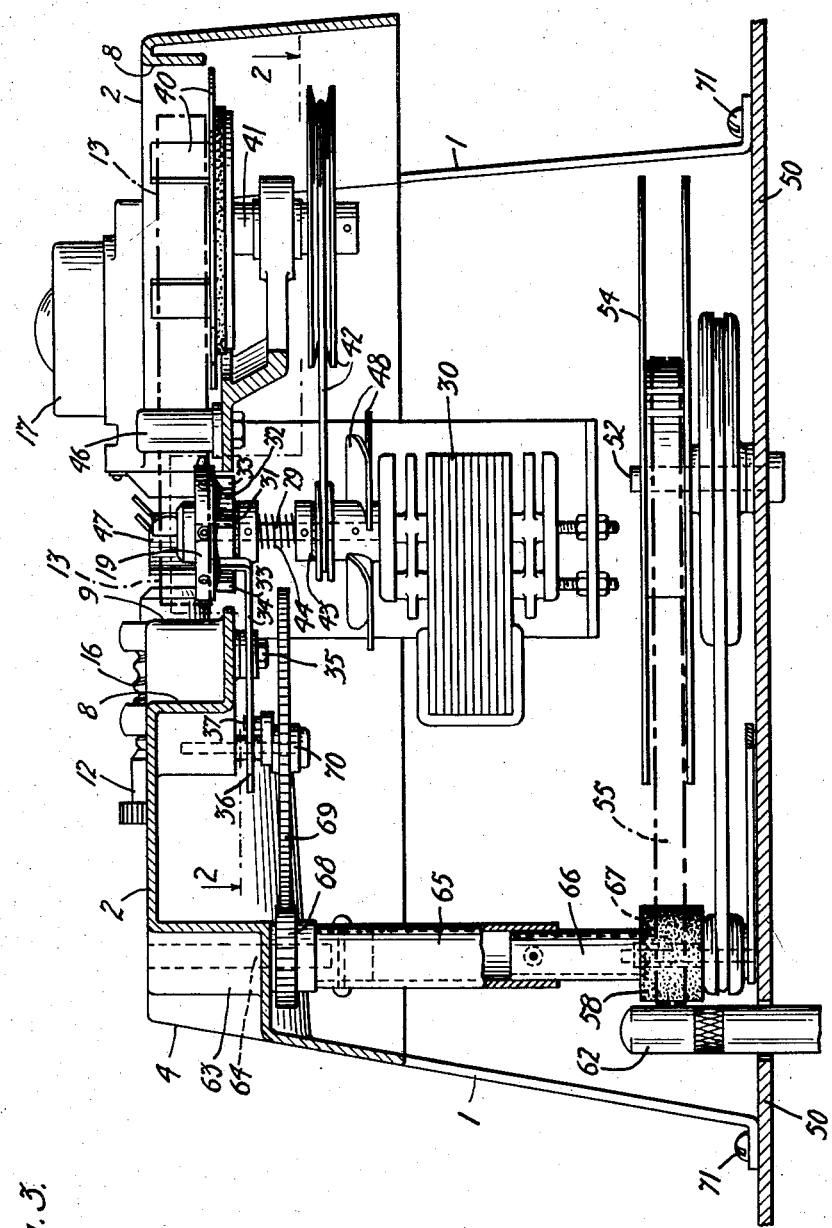

Referring to these drawings, the device or machine has a supporting arrangement 1 which supports a horizontal table 2 in which is formed an elongated depression 3 extending from the front side 4 of the table horizontally inwardly thereof to form an end wall 5 in which a horizontal hole 6 is formed. The table 2 has formed therein pocket depressions 7 and 8 located so as to span the axis of the depression 3 and which are interconnected transversely by a channel depression or well 9 extending transversely behind the end wall 5. Holes 10 and 11 are formed in the opposite sides of the depression 9 in axial alignment with the hole 6.

A projection lens 12 is mounted in the hole 6 and is located so as to project axially through the channel 3. The pocket depressions 7 and 8 are shaped to receive coiled horizontal film 13 having a span 14 extending horizontally through the channel depression 9, and a light source 15 is located beneath the table 2 behind the channel depression 9 so as to project a beam through the holes 10 and 11 and the lens 12. The lens is mounted in the usual barrel having a focusing threaded portion 16 engaged with the sides of the holes 6 and 10 and this barrel may project backwardly through the hole 10. The light source may be the projection lamp to which the numeral 15 is applied and should have a suitable reflector 17 and condensing lens 18. This lens may be mounted in the hole 11. The film has the usual sprocket holes and the span 14 is wrapped partly around a horizontal sprocket wheel 19 located in the pocket depression 8 and powered by means located below the table top 2 and which is described hereinafter.

The intermittent shifting of the film from one double frame to another, horizontally, is effected by appropriately powering the sprocket wheel 19, as previously indicated. This should be done so as to reliably and very rapidly shift the film.

According to the present invention, the sprocket wheel is rotatively mounted on a vertical shaft 29, without being positively fixed thereto. The shaft 29 is continuously rotated by an electric motor 30 and the shaft continuously tries to rotate the sprocket wheel 19 because the shaft is connected to the sprocket wheel through a friction clutch drive 31. The sprocket wheel is held against turning because this wheel has as an integral part, an escapement wheel 32 having teeth 33, restrained from rotation by an escapement 34 which must be rocked back and forth on its pivot 35 to permit the wheel 32 to turn and hence to permit this sprocket wheel 19 to turn. When the escapement 34 is moved from one to the other of its extremes of motion one of the teeth 33 escapes, the distance between the various teeth 33 being proportioned so that the sprocket wheel is rotated as required to shift one frame of the film. The rocking of the escapement 34 is controlled by reason of the escapement lever having a forked end 36 within which a crank 37 is located loosely so that when it turns against one or the other of the fork's prongs it trips the escapement lever.

In operation the motor 30 turns at very high speed. The sprocket wheel 19 is locked by the escapement system until the crank 37 trips the lever 34. At that time the sprocket wheel 19 which is very light weight and of low inertia, is suddenly connected, in effect, to the already rapidly rotating motor 30. Thus the shifting from frame to frame of film is carried out very reliably and at an extremely rapid shifting speed, well beyond the ordinary person's persistence of vision. The shifting direction of the film is from right to left so that on the projection screen the shifting is from left to right. This is in accordance with the requirements of the described process.

As auxiliary equipment, the depression 8 is provided with a film coiling reel 40, which is mounted by a vertical shaft 41 connected by a belt and pulley drive 42 with a friction clutch 43 which connects this drive system with the continuously rotating shaft 29 of the motor 30. A single compression coil spring 44 urges the clutch members 31 and 43 into their engaged members at all times. Thus there is a continuous effort on the part of the reel 40 to take up the surplus film.

The film is wrapped around the sprocket wheel 19 by suitable guides 45 and 46. A film gate 47 is located in the depression 9 so as to hold the film in a flat focal plane so as to get an image on the projection screen which is sharp throughout its extent. Preferably the shaft 29 of the motor 30 is provided with fan blades 48 which serve to keep the clutch members cool and provide air to cool the film and film gate in the projection aperture.

Due to the entire horizontal nature of the equipment the ordinary person has the psychological comfort of seeing an apparently simple mechanism.

It is almost impossible not to thread the film properly. Incidentally, the film may be in loose rolls and need not be provided with coil centers or reels. The vertical height of the entire equipment is not very extensive, so the apparatus will operate properly even on relatively insecure supports.

The novel intermittent motion provides the extremely high changing speed required to shift the horizontally extending double frame pictures. The projection lens is very well protected against being broken by objects dropping on the equipment.

The previously described psychological effect of sound motion pictures appears to be enhanced by the sound of the intermittent action. This, of course, occurs every 3 seconds because of the fixed and constant projection time interval contemplated by the present invention. The entire psychological effect is truly dynamic and one of action. It is something that must be actually experienced to be appreciated fully and when once appreciated it becomes apparent how the static quality of ordinary slide projection has been converted to the dynamic action associated with sound talking movies but without the great expense of the latter.

As described so far this portion of the new apparatus, relating to the projection of the pictures, is substantially the same as disclosed by my previously mentioned copending application.

However, in the present instance the supporting structure 1, which was in the form of a box in the earlier invention, now takes the form of a plurality of legs which are adapted to rest on or be attached to the top panel 50 of almost any standard tape recorder of the horizontal type. It is possible that the principles of this invention may be applied, with suitable design changes, to a vertical type of tape recorder.

The supporting structure or legs 1 are long enough to space the lowermost parts of the previously described mechanism above and free from the operating elements of the tape recorder.

Because tape recorders are so well known it is not considered necessary to describe them in great details. Normally they are enclosed in a box which is not shown by the drawings. This box includes a lid or cover ordinarily and it is to be noted that by extending the depth of the usual lid or cover it may be used to cover the mechanism attached to the tape recorder in the present instance.

The illustrated tape recorder includes the usual upstanding spindles 51 and 52 which carry the horizontal tape reels 53 and 54. The recorded magnetic tape 55 feeds from one of these reels 53 to the other one 54 in the form of a span which is guided across the magnetic recording and play-back head 56 by guide rollers 57 and 58. Felt pressure pads 59 and 60, mounted by a two-armed flat spring 61, keep the tape tightly against the roller 57 and the head 56. The spindles 51 and 52 are controlled in the usual manner to obtain proper tape feeding tension.

Now in recorders of this type it is necessary for the tape to travel at a constant speed. This constant speed is effected in many cases by causing the tape to frictionally engage tightly with a constant speed capstan 62, the roller 58, or some other suitable roller, causing the tape 55 to press tightly against this capstan 62. To make certain that a firm and uniform pressure is obtained, the roller 58 is made of an elastically flexible material. One common material is "neoprene." This elastically flexible roller 58 is of relatively large diameter and its upper end is exposed.

According to the present invention, the general idea is to cause the crank 37, which controls the escapement 34, to be coupled to one of the rotary elements of the sound recorder so that audio may be recorded on the tape and reproduced with consequent synchronism and proper timing with respect to the projection of the pictures successively by the previously described mechanism.

With the above in mind, the table 2 is provided with a bearing 63 which journals a vertically depending shaft 64 having a lower end coupled to a length of flexible tubing 65 which functions as a drive shaft. The bearing 63 is located so that this tubing or shaft 65 is oriented axially in alignment with the elastically flexible roller 58 of the tape recorder. The lower end of this tube or shaft 65 has connected therewith a depending connector 66, which may also be tubular, and which has a lower end 67 which is toothed so that when pressed downwardly on the top of the roller 58 a rotary drive is effected.

The shaft 65 is made in the form of flexible tubing because in the ordinary tape recorder the roller 58 may be retracted slightly to permit the threading of the tape between the roller 58 and the capstan 62. The flexibility of the shaft 65 permits this motion by the roller 58 without disconnecting the described rotary drive. Other forms of a flexible connection could be used.

Just below the table 2 the shaft 64 is keyed to a pinion 68 which meshes with a large gear 69 which drives the crank 37: crankshaft is shown at 70 and it is journaled vertically and depending from the table 2.

Now it can be seen that by choosing a proper gear reduction on the part of the pinion 68 and gear 69, or other gearing which might be used, the desired synchronism is effected.

One great advantage of the present invention is that with any given series of still pictures photographed on the still picture film, it is possible by using a blank or unrecorded magnetic tape, to record the audio on the magnetic tape appropriately and in time with the pictures being sequentially projected. Music and the spoken word may be thus transcribed and thereafter the desired projection of the pictures with the synchronized sound may be repeated indefinitely. The use of pre-recorded tape is also obviously possible.

It is to be understood that the tape and the film must be marked so that when rethreaded, after rewinding, the two start off properly together.

It is apparent that with this present invention all of the advantages of tape are obtained so that the apparatus of the present invention achieves fully the objectives noted.

Screws 71 or the like may be used to fasten the legs 1 to the tape recorder. The legs may be substituted by a frame or box-like arrangement if an opening is provided so that the tape recorder may be operated properly.

I claim:

A still picture film projector for attachment to a tape recorder, the latter having a panel on which are located the tape reels, sound head and a tape-driving capstan, said projector including a frame adapted to be positioned opposite to said panel and spaced therefrom and having mounted on said frame an optical projecting system for the film and including a rotary element for engaging and shifting the film, a constantly rotating motor, a slip clutch interconnecting said motor and element, an escapement wheel and pawl with the wheel connected to said element to lock it against rotation except when the pawl is moved to permit the wheel to escape momentarily to effect an intermittent advance of said still pictures, a rotary cam for moving said pawl, and means for connecting said cam to said capstan, of the tape recorder, the recorder having a tape pressure roller for pressing the tape against said capstan, the roller being elastically flexible, and said connecting means comprising a shaft connected to said cam at one end and with its other end toothed and adapted to press on said pressure roller.

References Cited in the file of this patent

UNITED STATES PATENTS

| | | |
|---|---|---|
| 971,891 | Hoglund | Oct. 4, 1910 |
| 1,083,498 | Kitsee | Jan. 6, 1914 |
| 1,101,760 | Seeman | June 30, 1914 |
| 1,275,227 | Coleman | Aug. 13, 1918 |
| 1,457,666 | Mannowski | June 5, 1923 |
| 2,136,209 | Finch | Nov. 8, 1938 |
| 2,380,250 | Lowy | July 10, 1945 |
| 2,642,234 | Anderson | June 16, 1953 |
| 2,751,815 | Larson | June 26, 1956 |
| 2,820,863 | Swanson | Jan. 21, 1958 |

FOREIGN PATENTS

| | | |
|---|---|---|
| 488,634 | Great Britain | Void patent publ. 1938 |
| 892,547 | France | Jan. 10, 1944 |
| 155,713 | Australia | Mar. 16, 1954 |
| 495,463 | Italy | June 15, 1954 |